United States Patent Office 3,553,126
Patented Jan. 5, 1971

3,553,126
METHOD OF REMOVAL OF MOLYBDATE IONS FROM WATER
Alfred W. Oberhofer, 11553 S. Kolin Ave., Alsip, Ill. 60658
No Drawing. Filed June 13, 1968, Ser. No. 736,577
The portion of the term of the patent subsequent to Dec. 3, 1985, has been disclaimed
Int. Cl. B01d 15/04
U.S. Cl. 210—37  8 Claims

ABSTRACT OF THE DISCLOSURE

Selective removal of molybdate ions from water by contacting the water with an acidified, basic anion exchange resin, the pH of the influent being adjusted within the range from 3.0 to 4.5 so as to operate at maximum capacity for the resin.

BACKGROUND OF THE INVENTION

Field of the invention

This invention is in the field of selective removal of molybdate ions from water by treating the water with an anion exchange resin, the acidic character of the resin and the pH of the influent being controlled to achieve maximum removal.

DESCRIPTION OF THE PRIOR ART

Molybdate ion removal presents a problem in waste streams of producers of molybdenum, in cooling tower discharge and in mining process streams.

So far as I am aware, the usual methods for the recovery of molybdenum compounds involve precipitation procedures. While there have apparently been some attempts to remove molybdenum compounds by ion exchange, these attempts have utilized liquid ion exchange media which are not particularly efficient and are expensive to use.

SUMMARY OF THE INVENTION

The present invention relates to the method of selectively removing molybdate ions from water containing such ions wherein the influent water is adjusted to a pH value of from 3.0 to 4.5 and preferably from a value of 3.2 to 4.0 prior to contacting the water with a basic anion exchange resin, preferably of the weakly basic type. The resin itself is pre-treated to acidify the same, preferably by treatment with sulfuric acid in sufficient amounts to provide the bisulfate ($HSO_4^-$) form. Under these conditions of operation, and using a macroporous resin as the treating agent, there is an apparent formation of polymolybdate complexes in the water being treated which are far more effectly removed, i.e., at a greater efficiency, than the molybdate ions themselves. Consequently, through the use of the present invention, the resin is able to operate at capacities which are substantially higher than the theoretical capacity of the ion exchange resin to remove molybdate ions.

DESCRIPTION OF THE PREFERRED EMBODIMENTS

The weak base anion exchange resins which provide the best results in the practice of the present invention are those which are macroporous, having pore diameters extending up to 1000 angstroms or so. Relatively large pore sizes are preferred because of the large size complexes which are produced. Chemically, these resin materials can be of different constitution, but should contain an intermediate amine as the exchange site. Particularly good results are obtained when the resin used is a mixture of secondary and tertiary amines, since these resins are considerably more stable to oxidation than are resins which have reaction sites consisting solely of primary and secondary amines.

The best resins found for this purpose are the polystyrene divinyl benzene amines which are prepared by chloromethylation followed by reaction with an amine. Other materials which can be used in accordance with the present invention are the weak base anion exchange resins such as the amine derivatives of epichlorohydrin.

Before the water to be treated is contacted with the resins, the resin is acidified by treatment with dilute sulfuric acid, hydrochloric acid, nitric acid or other strong acid. The preferred treatment involves reaction with sufficient sulfuric acid so that the resin is substantially at or near its bisulfate form. The acidified resin has been found to provide substantially improved results in the matter of removing molybdate than is possible with the untreated resin.

The treatment can be effected in the usual way by passing the water through a bed of particles of the basic anion exchange resin.

The specific description of the present invention will be made in conjunction with the following specific examples which illustrate several specific embodiments.

EXAMPLE I

A low solids test water was made up by using Chicago tap water and adding sodium molybdate dihydrate in a concentration of 30 p.p.m. of molybdate ion. The pH of the solution was adjusted to 4.5 using sulfuric acid.

A one-half inch inner diameter Lucite column was filled with 140 mm. (tapped volume) of IRA–93, a polystyrene-divinyl benzene amine of Rohm and Haas to a height of forty inches. The resin was converted to the bisulfate form with 200 milliequivalents of 1% sulfuric acid, using a contact time of 30 minutes to 1 hour. This resin had a salt splitting capacity of .16 milliequivalent per milliliter. The resin was exhausted with the low solids test water at a flow rate of 1 gallon per minute per cubic foot at room temperature. The capacity obtained in the run was 2.92 pounds of molybdate ion per cubic foot of resin.

EXAMPLE II

In this test, the test water was made up by using deionized water, adding sodium molybdate dihydrate to a concentration of 37 p.p.m. molybdate ion. The pH of the solution was adjusted to 3.5 using sulfuric acid.

The same resin as in Example I was exhausted with the test water at a flow rate of 1 gallon per minute per cubic foot at room temperature. The run was stopped before 50% leakage was obtained, and the capacity was approximated from the highest recorded leakage. The capacity thus obtained was 21.6 pounds of molybdate ion per cubic foot of resin, a value of more than seven times what it was at a pH of 4.5.

EXAMPLE III

The test water in this run was made up to 1500 p.p.m. total dissolved solids by filling a 550-gallon tank with Chicago tap water and then adding the following agents:

| | G. |
|---|---|
| $MgSO_4$ | 694 |
| NaCl | 1170 |
| $Na_2SO_4$ | 630 |
| $CaCl_2$ | 353 |
| $ZnCl_2$ | 7.3 |
| $Na_2HPO_4$ | 5.2 |
| $Na_2MoO_4 \cdot 2H_2O$ | 130 |

The resulting solution contained 37 p.p.m. molybdate ions. Its pH was adjusted to 3.5 with sulfuric acid.

The same resin as in the preceding examples was exhausted with the test water at a flow rate of 1 gallon per minute per cubic foot at room temperature. This test simulated the treatment of a cooling tower blowdown water, and was run to determine whether foreign dissolved ions interfered with the polymolybdate complex formation. The approximate capacity determined by this test was 15.0 pounds of molybdate ion per cubic foot of resin, or a level of about 7 pounds per cubic foot less than that obtained during the low solids run of Example II at the same pH.

The weak base anion exchange resin can be readily regenerated with sodium hydroxide. For example, the column can be regenerated with an amount of sodium hydroxide of about less than 12 pounds per cubic foot of resin at room temperature.

The results obtained strongly support the observation that a polymolybdate complex is being adsorbed on the resin at a pH of 3.5. For example, if the molybdate ion alone were being absorbed the capacity of the resin for molybdate ions would be 8.6 pounds per cubic foot. Both runs at a pH of 3.5 significantly exceeded this capacity. The low solids run was about two and one-half times the expected capacity and the high solids run was almost double. The polymolybdate complexes range from 1 to 16 atoms of molybdenum per molecule, which is a possible explanation of why the experimental capacities at a pH of 3.5 were so much larger than the theoretical capacity.

While the use of the weakly basic anion exchange resins represent the preferred form of the invention, satisfactory results can also be obtained through the use of strong base resins, such as "Dowex SBR" and "SBR-P," provided that the influent pH is adjusted as in the case of the weak base materials and provided that macroporous materials are used. Regeneration of the strong base resins may be effected by the use of a mixture of sodium hydroxide and sodium chloride, followed by a washing with a neutral salt to elute hydroxyl ions.

It should be evident that various modifications can be made to the described embodiments without departing from the scope of the present invention.

I claim as my invention:

1. The method of selectively removing molybdate ions from water containing such ions which comprises acidifying a basic anion exchange resin and then contacting the acidified resin with said water to cause selective removal of molybdate ions from said water.

2. The method of claim 1 in which the pH of the water is adjusted to a value of from 3.0 to 4.5 before contacting the same with said resin.

3. The method of claim 1 in which the pH of the water is adjusted to a value of from 3.2 to 4.0 before contacting the same with said resin.

4. The method of claim 1 in which said resin is a macroporous material.

5. The method of claim 4 in which said resin has pore diameters up to about 1000 angstroms.

6. The method of claim 1 in which said resin is acidified with sulfuric acid to the bisulfate form.

7. The method of claim 1 in which the pH of the water is adjusted to a value at which polymolybdate complexes are formed before contacting the same with said resin.

8. The method of selectively removing molybdate ions from water containing such ions which comprises acidifying a weakly basic anion exchange amine resin with sulfuric acid to produce the bisulfate form of said resin, adjusting the pH of said water to a value of from 3.2 to 4.0 and then contacting the resin with said water to cause selective removal of molybdate ions from said water.

References Cited

UNITED STATES PATENTS

| | | | |
|---|---|---|---|
| 3,332,737 | 7/1967 | Kraus | 210—37X |
| 3,382,034 | 5/1968 | Kraus | 210—37X |
| 3,414,510 | 12/1968 | Oberhofer | 210—37 |

J. L. DeCESARE, Primary Examiner

UNITED STATES PATENT OFFICE
CERTIFICATE OF CORRECTION

Patent No. 3,553,126          Dated January 5, 1971

Inventor(s)   Alfred W. Oberhofer

It is certified that error appears in the above-identified patent and that said Letters Patent are hereby corrected as shown below:

In the heading to the printed specification, after line 6, insert -- assignor to Nalco Chemical Company, Chicago, Ill., a corporation of Delaware --.

Signed and sealed this 4th day of May 1971.

(SEAL)
Attest:

EDWARD M. FLETCHER, JR.
Attesting Officer

WILLIAM E. SCHUYLER,
Commissioner of Patent